Jan. 26, 1932.   H. E. LAFAYETTE ET AL   1,842,723
PARACHUTE RIP CORD APPARATUS
Filed Aug. 19, 1931    3 Sheets-Sheet 1
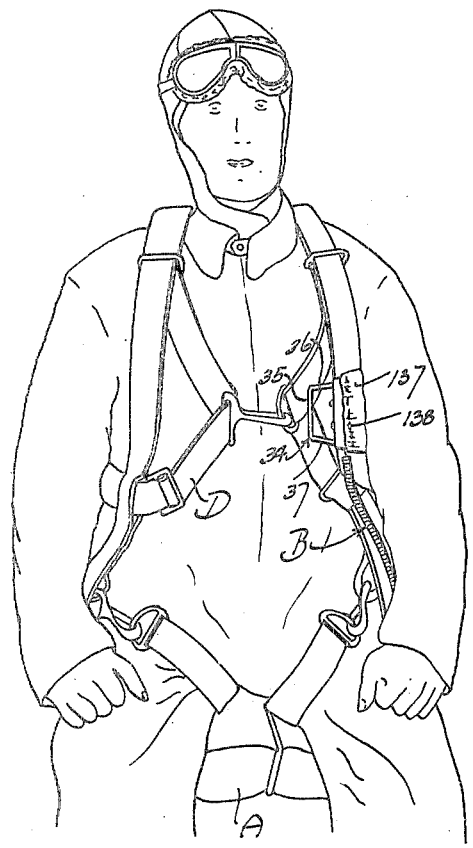
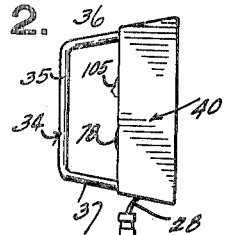
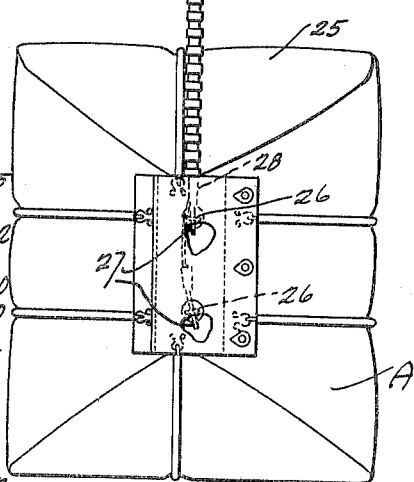
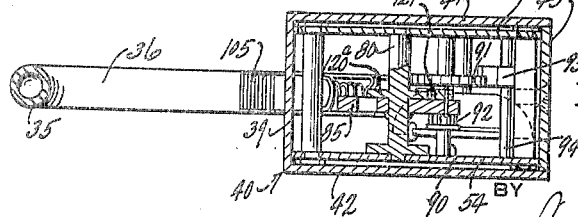
INVENTORS.
Harvey E. Lafayette
George Waite
Lyman H. Ford
BY Lancaster, Allwine and Rommel
ATTORNEYS.

Jan. 26, 1932.  H. E. LAFAYETTE ET AL  1,842,723
PARACHUTE RIP CORD APPARATUS
Filed Aug. 19, 1931   3 Sheets-Sheet 2
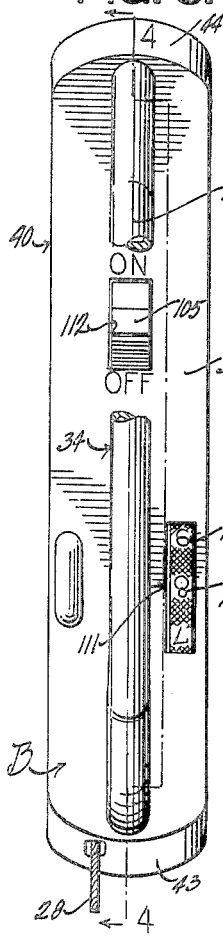
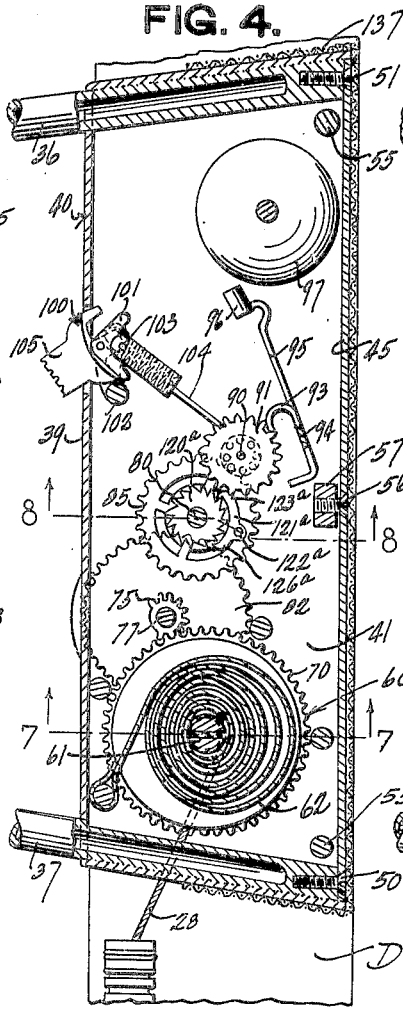
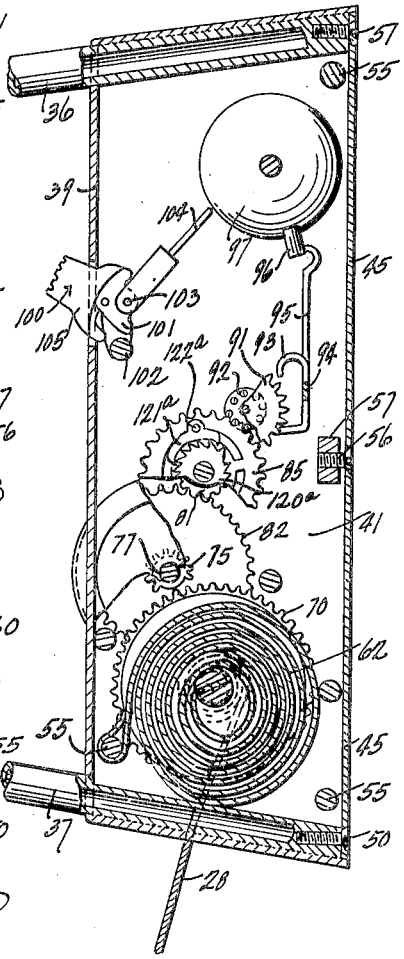
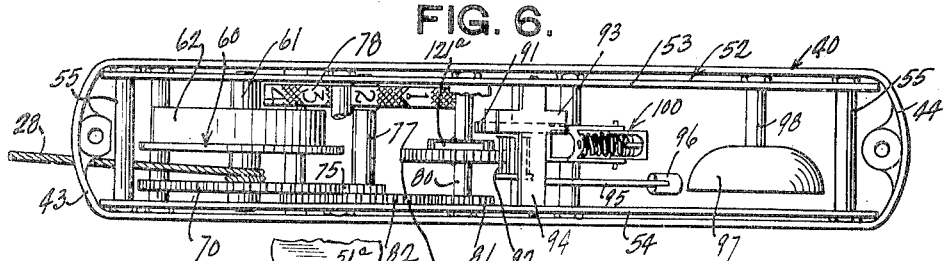
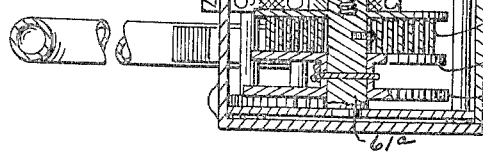
INVENTORS.
Harvey E. Lafayette
George Waite
Lyman H. Ford
BY
Lancaster, Allwine and Rommel
ATTORNEYS.

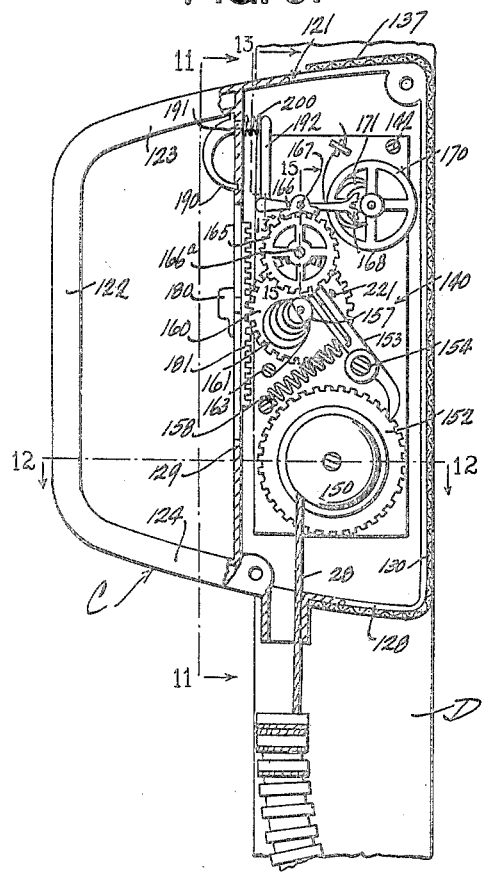

Patented Jan. 26, 1932

1,842,723

UNITED STATES PATENT OFFICE

HARVEY E. LAFAYETTE, GEORGE WAITE, AND LYMAN H. FORD, OF BUFFALO, NEW YORK, ASSIGNORS TO IRVING AIR CHUTE COMPANY, INC., OF BUFFALO, NEW YORK, A CORPORATION

PARACHUTE RIP CORD APPARATUS

Application filed August 19, 1931. Serial No. 558,156.

This invention relates to improvements in parachute release mechanisms.

The primary object of the invention is the provision of an improved parachute rip cord apparatus embodying means for both manual or timed automatic operation of the rip cord for releasing a parachute, and embodying improvements over U. S. application, Serial Number 534,371, filed May 1, 1931, in the provision of a compact handle which in itself embodies means for either manual or automatic operation of the rip cord.

A further object of this invention is the provision of an improved rip cord operating mechanism which embodies a handle having associated as a part thereof means for automatically operating a parachute rip cord after a delayed interval; the improved rip cord operating mechanism embodying a relatively economical assemblage, one which is practical, and one which will operate with a high safety factor.

Other objects and advantages of this invention will be apparant during the course of the following detailed description.

In the accompanying drawings forming a part of this specification, and wherein similar reference characters designate corresponding parts throughout the several views, Figure 1 is a view showing the improved rip cord in its associated relation with a parachute harness upon an aviator.

Figure 2 is a view showing the associated relation of the improved rip cord mechanism with a conventional parachute pack.

Figure 3 is a fragmentary plan view of the improved rip cord mechanism handle, showing the operating parts thereon.

Figure 4 is a sectional view taken through the rip cord mechanism substantially on the line 4—4 of Figure 3.

Figure 5 is a view similar to Figure 4 showing the position of the automatic rip cord operating details after a rip cord has been pulled for releasing a parachute from a pack.

Figure 6 is a bottom plan view of the parachute rip cord operating handle and associated details, with the cover of the handle casing removed.

Figures 7 and 8 are cross sectional views taken substantially on their respective lines in Figure 4 of the drawings.

Figure 8ª is a cross section taken through a modified mechanism in which the cord pulling spring is key wound.

Figure 9 is a sectional view taken through a modified form of rip cord operating mechanism, more particularly showing the compact association of automatically operating timing mechanism in a rip cord handle, by means of which an aviator may selectively operate the rip cord for a release of the parachute either manually or automatically.

Figure 10 is a view similar to Figure 9, but showing the timing details in position after the rip cord has been pulled and released from a parachute pack.

Figure 11 is a sectional view taken substantially on the line 11—11 of Figure 9 of the drawings.

Figure 12 is a sectional view taken substantially on the line 12—12 of Figure 9 of the drawings.

Figures 13 and 14 are cross sectional views taken substantially on their respective lines in Figures 9 and 10 of the drawings, showing more particularly a safety release which must be operated in order to get the timing mechanism in operation.

Figure 15 is a cross sectional view taken substantially on the line 15—15 of Figure 9.

Figure 16 is a side elevation of the details shown in Figure 15.

In the drawings, wherein for the purpose of illustration are shown preferred and modified forms of the invention, the letter A may generally designate a parachute pack of conventional nature, which receives parachute apparatus therein such as is conventionally used throughout the world, and more particularly shown in U. S. Patents #1,340,423; 1,403,983; 1,462,456; 1,554,192, and 1,560,366. This pack includes the improved rip cord mechanism B associated therewith, which is the type shown in Figures 1 to 8 inclusive, or improved rip cord mechanism C shown in Figures 9 to 16 inclusive may be used.

The pack A generally comprises a container 25 wherein the parachute (not shown) is packed. The container 25 has means associated therewith for retaining it closed, including certain eyelets on parts of the container through which apertured projections 26 are disposed; the pin ends 27 of the rip cord body 28 being releasably threaded through the openings of the projections 26 in a manner well understood in this art. The pack A may be of any approved type, either harness attached or releasable. It may be a seat, chest, back, lap, or some other type of pack. The most conventional type of pack is the seat pack, shown in Figure 1, and for such construction the rip cord mechanisms B or C are mounted upon the harness D of the aviator in a readily accessible relation.

In the form of rip cord mechanisms B and C it has been the aim to provide a practical device which may embody compactly and efficiently both rip cord manual operating means and rip cord automatic operating means. To this end both forms of the invention B and C embody selective time controlled mechanism for operating the rip cord. A single length rip cord 28 is employed.

In the form of invention B the handle proper includes a hand grasping bar 35 having side bars 36 and 37 extending preferably divergently away from each other at opposite ends of the bar 35. These side bars 36 and 37 are hollow, and as shown in Figures 4 and 5 are extended through the ends of a top wall 39 of a case 40 which is rigidly connected as a part of the handle 34. The said case 40 is substantially rectangular in shape, including the top wall 39 above mentioned, which along the side longitudinal edges thereof is integrally connected with relatively spaced depending skirt walls 41 and 42, shown in Figures 7 and 8 of the drawings, and elsewhere. Convexly arcuated end walls 43 and 44 are provided, which relatively slope divergently from the top wall 39 towards the opposite end of the casing, where a detachable closure plate 45 is provided. The end portions of the side bars 36 and 37 of the handle proper enter through the end openings of the top wall 39, as shown in Figures 4 and 5 of the drawings, and therein are soldered or welded to the inner surfaces of the end walls 43 and 44 of the casing, as shown. The closure lid 45 is detachably held in a countersunk relation in the open bottom of the case 40 by means of countersunk head screws 50 and 51, shown in Figures 4 and 5 of the drawings. This entire handle mechanism and case is preferably made of some light weight material as aluminum and it detachably receives therein the time controlling mechanism for the rip cord, which is carried upon a detachable frame 52.

The frame 52 comprises a pair of plates 53 and 54 which are held spaced in usual manner by suitable detachable posts 55 transversely extending between said plates. This frame 52 may be secured in any approved manner within and to the case 40, preferably by means of a countersunk head screw 56 extending through the closure 45 of the case into detachable connection with a transverse bar 57, shown in Figures 4 and 5 of the drawings, extending between and secured at its ends to the plates 53 and 54.

The frame 52 supports a rotatable drum 60 upon which the wire rip cord 28 is wound for a release operation of the parachute. The drum 60 is keyed upon a rotatable shaft 61, which bears at its ends in the plates 53 and 54. A spiral shaped leaf spring 62 is keyed at its inner end to the shaft 61, and at its outer end to one of the posts 55 above mentioned, as shown in Figures 4 and 5 of the drawings, which normally expands to rotate the drum 60 for a winding of the rip cord 28 thereon. The details of this spring and drum are also shown in Figure 7.

A gear wheel 70 forms one flange of the drum 60, with which is operatively associated an escapement mechanism and an intermediate associated detent which is operated by the escapement mechanism for releasing the drum after a predetermined time interval, in order to permit the spring to wind the cable on the drum.

The mechanism above outlined includes a segmental gear 75 keyed upon a rotary shaft 77; the latter bearing at its ends in the plates 53 and 54. The shaft 77 has the pinion 75 so keyed thereon that the teeth of it will mesh with the teeth of the drum gear 70 for a part revolution of the gear 75, and will then ride out of mesh with the teeth of the gear 70, releasing the latter so that the spring 62 may expand for rotating the drum and winding the rip cord thereon. This segmental gear 75 is normally restrained in mesh with the gear 70, until the lapse of a predetermined interval, by means of escapement mechanism to be described. Keyed upon the shaft 77 is an indicator wheel or member 78, best shown in Figures 3 and 6 of the drawings, the outer peripheral surface of which is provided with a series of consecutive numbers designating seconds which are intended to elapse after the timing mechanism is set into operation until the segmental gear rides off the gear 70 and permits the spring to actuate the drum for a rip cord pull.

The escapement mechanism includes a counter shaft 80 rotatably supported between the plates 53 and 54, having a pinion 81 thereon which is in mesh with a large gear 82; the latter being keyed on the shaft 77 in adjacent relation with the pinion or gear 75. Rotatably mounted upon the shaft 80 is a suitable gear 85 which is operatively connected by a pawl and ratchet mechanism with the shaft 80, so as to key the gear 85 with the shaft 80 when there is a tendency of the spring 62 to expand and rotate the shaft 80.

The escapement mechanism furthermore includes a shaft 90 rotatably bearing in the plates 53 and 54, upon which an escapement wheel 91 is provided, the same having fixed therewith a bar pinion 92, which normally meshes with the gear 85 above described. An escapement lever or arm 93 is pivotally supported upon a bar 94; the latter bearing oscillatively at its ends on the plates 53 and 54, as shown in Figure 6 of the drawings; this lever 93 being of the usual escapement type and permitting a step by step escape of the gear 91. The escapement lever 93 has a weighted arm 95 thereon, the hammer 96 of which is in position to tap a bell 97, supported at 98 upon the frame plate 53.

A suitable spring operated switch type of detent 100 is provided, which includes a frame 101 mounted upon a bar 102; the latter being affixed upon the frame plates 53 and 54, as shown. The frame 101 pivotally supports at 103 the detent arm 104, which includes a spring and the finger engaging snap 105 for throwing the detent arm 104 into or out of engagement with the teeth of the escapement wheel 91, as shown in Figures 4 and 5 of the drawings.

The time re-setting wheel 78 is so mounted with respect to the frame 52 that the upper segmental portion thereof faces and extends through a suitable opening 110, shown in Figure 3 of the drawings, and with reference to a mark 111 delineated upon the top wall of the casing 40, the operator is able to determine the number of seconds which will elapse after setting the device in operation before the rip cord will be pulled. The finger engaging snap 105 of the switch type of detent 100 also extends through a suitable opening 112 provided at the top wall of the casing 40, as shown.

The spring 62 is of course tensioned by pulling the rip cord 28 for unwinding it from the drum 60. This tensioning of the spring is accomplished with the stripped portion of the segmental gear 75 in the position shown in Figure 5, and thereafter the re-setting wheel 78 is manipulated to indicate the desired number of seconds for which the time controlling mechanism is to be set by bringing the desired numeral into position opposite the indicator mark 111. This meshes the teeth of the mutilated gear 75 with the drum gear 70. Thereafter the switch detent 100 is snapped into the position shown in Figure 4 and the device will retain the set position with the spring under tension and the rip cord ready to be wound upon the drum upon release of the spring. This release operation is caused by snapping the switch from the position shown in Figure 4 to the position shown in Figure 5, which throws the detent arm out of engagement with the gear 91, so that the escapement lever 93 may oscillate to permit a step by step rotation of the escapement wheel. This step by step rotation of the escapement wheel takes place due to the action of the spring 62 which throws the escapement lever into operation through the chain of gearing on the shafts 77, 80 and 90. Of course the instant that the switch part 105 is snapped to release the detent from the escapement wheel the hammer 96 of the escapement member will tap the bell 97 intermittently for indicating the efficiency of the device to the operator.

The pawl and ratchet wheel mechanism which connects the gear 85 with the shaft 80 includes the ratchet wheel 120$^a$ keyed directly with the shaft 80, and the gear wheel 85 has a pawl 121$^a$ pivoted at 122$^a$ thereon, so that its hook end 123$^a$ normally engages the teeth of the ratchet wheel 120$^a$ to connect the gear 85 with the shaft 80 under expansion action of the spring 62, and thus the force of the spring 62 operates the escapement. The pawl 121$^a$ is of the double arm type, so that at opposite sides of the pivot thereof from the end 123$^a$ which normally engages the teeth of the ratchet wheel 121$^a$ an arm portion 126$^a$ is in position to engage the teeth of the ratchet wheel in cooperation with the end 123$^a$ to prevent any liability of slip of the pawl off its ratchet wheel for a distance greater than the length of one tooth. This pawl and ratchet wheel connection of the gear 85 with the shaft 80 permits an operator to re-set the timed operation of the rip cord even after the detent 100 has been released from engagement with the escapement wheel. Thus, if an operator is falling through the air, and after operating the switch 100 he wishes to delay opening of the parachute pack beyond a time interval than that for which the mechanism was originally set it is merely necessary to engage the peripheral portion of the re-set wheel 78 with his thumb and rotate the re-set wheel 78 to bring the desired numeral, indicating the re-set time, into view opposite the indicator delineation 111. Of course, as soon as the stripped portion of the gear 77 rides into facing relation with the teeth of the gear 70 the escapement mechanism will be out of connection with the drum, and the spring 62 will quickly rotate the drum 60 for winding the rip cord 28 thereon. A considerable pull is thus exerted upon the rip cord 28, jerking its pins 27 from the projections 26 and releasing the flaps of the parachute container, so that the parachute canopy may deploy as in conventional practice.

As is shown in Figure 1 of the drawings a flexible pocket 137 is provided on the harness D of the operator, which is of the usual type and has a contracting elastic band along the free end thereof which contracts the ends of the pocket about the divergent ends of the case 40 when received within the pocket, as shown in Figure 1 of the drawings. The operation of this pocket is set forth in U. S. Patent #1,758,795. It is quite apparent that the operator may manually engage the handle 34 for pulling the rip cord, or without removing the rip cord handle from the pocket may set the automatic timing device into operation as above described for pulling the rip cord after a predetermined interval.

Referring to the form of invention C, the same embodies clockwork mechanism and a slightly different arrangement of details for automatically pulling the rip cord. In this form of invention there is provided a clockwork case 121 which is rectangular in form and includes a back plate 126 with end walls 127 and 128 integral therewith. Parallel top and bottom walls 129 and 130 are provided. These walls define a box-like compartment which is closed by a detachable plate 132. Connected with the case 121 is a handle including a hand grasping bar 122 having side bars 123 and 124 divergently extending away from opposite ends of the bar 122 and being rigidly and preferably integrally connected with opposite ends of the wall 129. The outer surfaces of the walls 127, and 128 of the case are preferably contiguous with the outer divergent edges of the side bars 123 and 124, so as to be releasably held in position in the flexible pocket 137 in the same manner as above described for the preferred embodiment of the invention.

Within the case 121 there is housed a frame 140 for receiving the clock-work details. This frame is of usual construction including the plates 141 which are held spaced by suitable posts 142. This framework 140 may be secured in any approved manner within and to the case 121. The frame 140 supports a drum 150 similar to the drum 70 in the form of invention B above described, upon which the wire rip cord 120 is wound for a release operation of the parachute pack. A spring 151 is normally under contraction for causing a winding of the drum 150, and the drum 150 has keyed therewith a ratchet wheel 152. A restraining pawl or detent 153 is pivoted at 154 on the frame 140 which has an end engageable with the teeth of the ratchet wheel 152 to prevent rotation thereof in the direction caused by expansion of the spring 151. The frame 140 has a shaft 156 therein, provided with a suitable cam 157 which has a flat eccentric side against which the lever 153 is urged by its connected spring 158 to cause a release of the pawl 153 from the ratchet wheel 152. Keyed with the shaft 156 is a gear wheel 160 and a spring 161 is normally connected at one end 163 to the framework 140 and at its opposite end to the shaft 156 for causing a movement of the cam 157 into a trip position.

An escapement mechanism differing somewhat from the escapement mechanism of the form of invention B is employed. It includes an escapement wheel 165 which is freely rotatable upon a shaft 166ª bearing in the plates of the frame 140, as shown in Figures 15 and 16 of the drawings. This escapement wheel 165 has the usual oscillative escapement lever mechanism 166 associated therewith; the latter being pivoted at 167 in the frame 140 and having one end engaging the usual eccentric pin 168 on the balance wheel 170; the latter being urged by the usual hair spring 171 to oscillate the instant that the escapement wheel 165 is free to rotate. Freely rotatable upon the escapement wheel shaft 166ª is a pinion 175. This pinion 175 and the facing side of the escapement wheel 165 are provided with complementary clutch faces 177, and a spring 178 normally urges the pinion 175 into clutching engagement with the escapement wheel 165. The pinion 175 is of course in mesh with the teeth of the gear 160 and a spring 161, through the gear 160 and the pinion 175, will cause the escapement wheel 165 to rotate at the proper time.

Improved means is provided for setting the time interval at which the detent 153 is tripped. This means includes a timing button or member 180 which is fixedly connected with a rack 181 in mesh with the teeth of the gear 160. The button 180 extends through a suitable slot 183 in the plate 129 of the case, and it is to be noted that this plate 129 is graduated and suitably designated, as shown in Figure 11, with numerals which represent the number of seconds at which the clock-work mechanism may be set for an automatic release operation of the rip cord 120. The timing button 180 may have a suitable indicator which may cooperate with these delineations as shown in Figure 11, and in Figure 11 the button is shown as set for a six second lapse before the detent 153 is tripped. The button 180 and rack 183 may be re-set from a zero position to any of the delineations along the plate shown in Figure 11 because the gear wheel 160 is geared with the pinion 175, and the latter is not positively keyed to the escapement wheel 165 except through the spring urged clutch connection above described. Inasmuch as the escapement mechanism will permit the escapement wheel 165 to only rotate in one direction, it is apparent that this re-setting of the rack will cause the pinion 175 to rotate and slide the clutch faces 177 against each other without rotating the escapement wheel 165.

After the operator has set the timing button at the desired interval the device is set into operation by moving the control member 190 from the "off" position shown in Figure 16 to the position indicated by dotted lines in that figure. This member 190 includes a shaft 191 which is pivoted in the wall 129 of the case, and it has a cam segment 192 within the case which moves into obstructing relation with the oscillating lever portion of the escapement mechanism, when the member 190 is in the "off" position, shown in Figure 16. A spring 200 normally throws the member 190 at its free end into a notch at the "off" position, and by pulling slightly outwardly on the member 190 it may be lifted out of this notch and moved laterally and dropped into another notch 201, shown in Figure 16, which shifts the cam segment 192 to the position shown in Figure 19 and at which time the escapement lever is free to oscillate. This movement of the control member 190 from an "off" position to an "on" position immediately sets the clock-work mechanism in operation and after the lapse of the desired interval, at which the button 180 is set, the eccentric face of the cam 157 will permit the pawl 153 to be tripped and release the ratchet wheel 152. It is obvious that the spring 151 will immediately wind the rip cord 120 thereon and pull it from the restraining means of the pack and cause the pack container to open.

The detent lever 153 is bifurcated to provide one yieldable arm portion 220 which directly operates against the trip arm. This arm is controlled by an adjusting screw 221 so as to permit a trip release at fractions of a second.

From the form of invention B it is readily apparent that an operator in an emergency may quickly cause a spring pull of the rip cord by a re-setting rotation of the wheel 78 until the stripped portion of the segmental gear 75 rides into spaced relation with the teeth of the gear 70 and releasing the latter. A similar emergency release may be provided for immediately freeing the detent 153 from the teeth of the ratchet wheel 152 in the form of invention C, although this emergency release will take somewhat the form of that shown in the co-pending application above referred to.

In the form of invention shown in Figure 8ª means is provided to key wind the spring. To this end a shaft 61ª has a spring 62ª keyed thereon at one end. A hub sleeve 62ᵇ is keyed to the shaft 61ª by passing the rip cord diametrically through the shaft and hub. The latter has spaced annular flanges 60ª and 70ª integral therewith, the former serving as a guard for the spring 62ª and the latter being peripherally toothed to comprise a gear corresponding to the gear 70 of the form of invention B. The spring 62ª is guarded at its opposite side by a flange 71ª rigid with the shaft 61ª. The case 40ª has an opening 40ᵇ in one wall 41ª thereof, which aligns with a similar opening in the frame plate 53ᵇ. These openings face one end of the shaft 61ª, and the latter has a socket 51ª in said end, preferably screw threaded, although it may be polygonal in section, to receive the bit end of a detachable key 52ª, as a means of winding the spring 62ª.

Various changes in the shape, size, and arrangement of parts may be made to the forms of invention herein shown and described, without departing from the spirit of the invention or the scope of the claims.

We claim:

1. The combination with a parachute harness and a pack therefor, of a release cord extending from said pack, a handle with a hand grasping portion and sides extending from said hand grasping portion, automatically operating clock-work controlled means directly carried by said handle having the release cord connected therewith for a pull upon the latter upon predetermined operation of the clock-work mechanism, and resilient means mounted on said harness for yieldably holding said handle and associated clock-work mechanism thereon.

2. In parachute rip cord mechanism the combination of a handle, a rip cord, and means carried by the handle and movable therewith during a manual release pull of the handle for exerting a pull on the rip cord automatically and independent of manual operation of said handle.

3. In parachute rip cord mechanism the combination of a rip cord body, a handle including a portion to be grasped by an aviator, winding means on the handle connecting the rip cord to the handle to permit the pulling of the rip cord as an incident of manual actuation of the handle, and time controlled means for actuating said winding means in order to pull the rip cord independent of manual actuation.

4. In a parachute rip cord mechanism the combination of a handle including a hand grasping portion and a housing fixedly connected with the hand grasping portion, a flexible rip cord, winding means in the housing connecting the rip cord to the housing and handle, and selectively operated step by step escapement means for actuating said winding means at a selected time lapse.

5. In parachute rip cord mechanism the combination of a handle including a hand grasping portion and a housing fixedly connected with the hand grasping portion, a flexible rip cord, winding means in the housing connecting the rip cord to the housing and handle, selectively operated step by step escapement means for actuating said winding means at a selected time lapse, said handle including a hand grasping portion and sides, the outer surfaces of the sides of said handle and the adjacent end surfaces of said housing being substantially contiguously divergent away from the hand grasping portion.

6. The combination with a parachute harness and a pack therefor, of a release cord extending from said pack, a handle connected with the cord having a hand grasping bar, winding means directly carried by the handle for winding the cord thereon to exert a release pull, means normally restraining the operation of said winding means, means to set the last mentioned means in operation after a predetermined interval, and means on the parachute harness for releasably holding the handle so that an operator may grasp the same and by pulling release the rip cord.

7. In parachute rip cord mechanism the combination of a handle, a rotatable drum carried by the handle, a flexible rip cord connected with the drum for winding thereon to exert a release pull, spring means for rotating the drum to wind the rip cord thereon, restraining means normally preventing rotation of the drum, and time regulated means for tripping the restraining means after a selected interval.

8. In parachute rip cord mechanism the combination of a release cord, a frame, spring actuated winding means on the frame for winding the rip cord thereon to exert a release pull, means to restrain movement of the winding means, means to control the tripping of the last mentioned means at a predetermined time, and signalling means set in operation by the last mentioned means during the actuation of said spring actuated winding means.

9. In parachute rip cord mechanism the combination of a supporting frame, a spring actuated winding drum receiving the rip cord thereon for winding, said drum having a gear connected therewith, an escapement mechanism, means to set the escapement mechanism in operation, and a chain of gears connected between the escapement mechanism and the first mentioned gear including a segmental gear directly in mesh with the drum gear having a portion stripped of teeth to disconnect the drum gear from the chain of gears after the escapement mechanism has been in operation for a predetermined interval.

10. In parachute rip cord mechanism the combination of a supporting frame, a spring actuated winding drum receiving the rip cord thereon for winding, said drum having a gear connected therewith, an escapement mechanism, means to set the escapement mechanism in operation, a chain of gears connected between the escapement mechanism and the first mentioned gear including a segmental gear directly in mesh with the drum gear having a portion stripped of teeth to disconnect the drum gear from the chain of gears after the escapement mechanism has been in operation for a predetermined interval, said chain of gears including a pawl and ratchet to re-set the position of the segmental gear upon the drum gear to vary the interval during which the drum gear rotates before it rides out of engagement with the segmental gear.

11. In parachute rip cord operating mechanism the combination of a supporting frame, spring actuated winding means for receiving the rip cord thereon to exert a release pull, means normally restraining operation of the spring actuated winding means including an escapement mechanism and a detent for releasably restraining operation of the escapement mechanism, said escapement mechanism including an oscillating escapement lever, and annunciator means connected with the lever for operation during oscillation of said escapement lever.

12. In parachute rip cord operating mechanism the combination of a supporting frame, spring actuated winding means for receiving the rip cord thereon to exert a release pull, means normally restraining operation of the spring actuated winding means including an escapement mechanism and a detent for releasably restraining operation of the escapement mechanism, said escapement mechanism including an oscillating escapement lever, and annunciator means connected with the lever for operation during oscillation of said escapement lever, said annunciator means including a hammer directly connected with the oscillating lever, and a bell in position to be contacted by said hammer.

13. In automatic rip cord operating mechanism the combination of a frame, spring actuated winding means on the frame, a rip cord connected with the winding means for winding thereon to exert a release pull, a gear connected with the winding means for rotation therewith, a segmental gear in position to mesh with the first mentioned gear during only a partial rotation of the segmental gear, an escapement wheel, a chain of gears between the escapement wheel and the segmental gear, a manually operated detent for restraining rotation of the escapement wheel, and an escapement lever for releasing the escapement wheel in a step by step movement.

14. In automatic rip cord operating mechanism the combination of a frame, spring actuated winding means on the frame, a rip cord connected with the winding means for winding thereon to exert a release pull, a gear connected with the winding means for rotation therewith, a segmental gear in position to mesh with the first mentioned gear during only a partial rotation of the segmental gear, an escapement wheel, a chain of gears between the escapement wheel and the segmental gear, a manually operated detent for restraining rotation of the escapement wheel, an escapement lever for releasing the escapement wheel in a step by step movement, a hammer connected with the escapement lever for oscillation therewith, and a bell in position for intermittent contact by said hammer.

15. In automatic rip cord operating mechanism the combination of a frame, spring actuated winding means on the frame, a rip cord connected with the winding means for winding thereon to exert a release pull, a gear connected with the winding means for rotation therewith, a segmental gear in position to mesh with the first mentioned gear during only a partial rotation of the segmental gear, an escapement wheel, a chain of gears between the escapement wheel and the segmental gear, a manually operated detent for restraining rotation of the escapement wheel, an escapement lever for releasing the escapement wheel in a step by step movement, and pawl and ratchet means included in said chain of gears for re-setting the segmental gear with respect to the gear of the winding means without reverse actuation of the escapement wheel.

HARVEY E. LAFAYETTE.
GEORGE WAITE.
LYMAN H. FORD.